(No Model.)
J. J. LANGDON.
ADJUSTABLE MIRROR BRACKET.
No. 325,419. Patented Sept. 1, 1885.
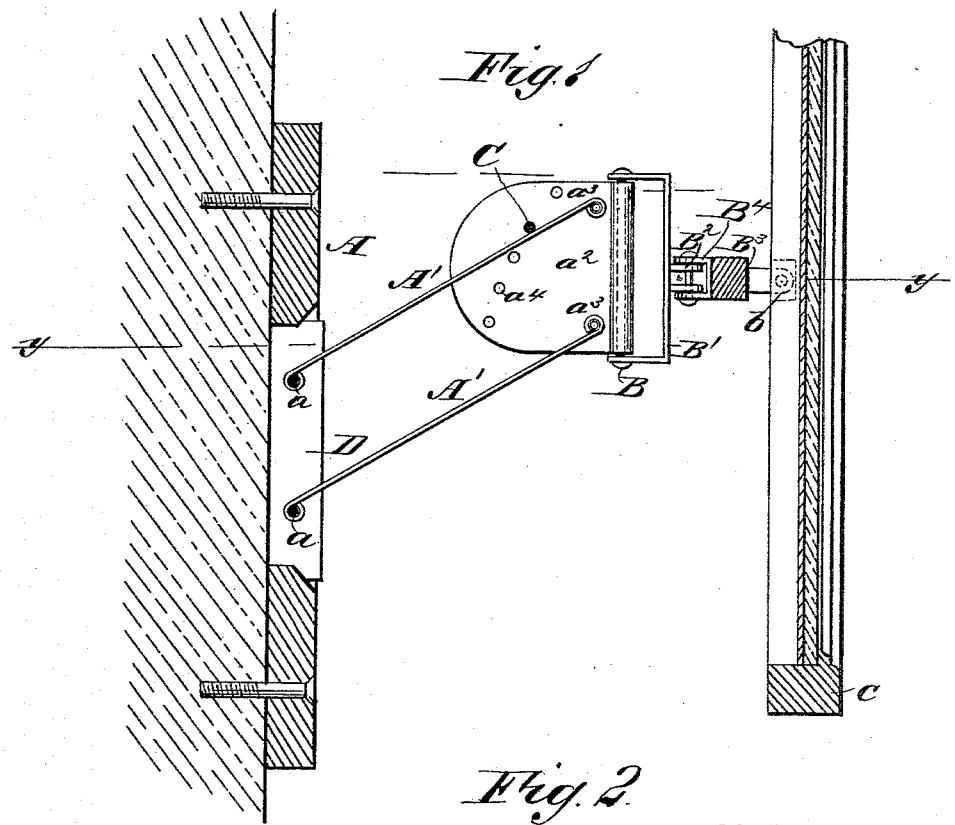
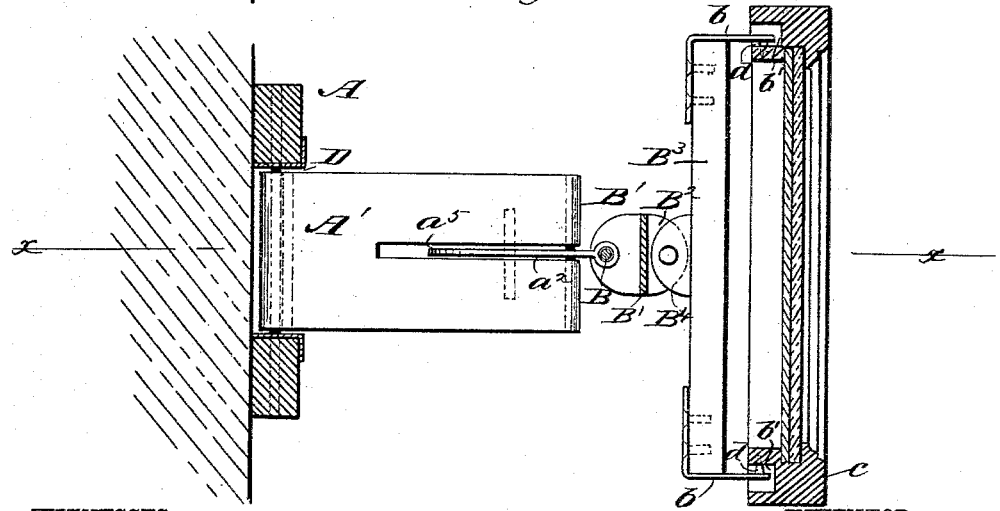
WITNESSES:
F. McArdle
C. Sedgwick
INVENTOR:
J. J. Langdon,
BY Munn & Co
ATTORNEYS.

UNITED STATES PATENT OFFICE.

JOHN J. LANGDON, OF SOUTH PUEBLO, COLORADO.

ADJUSTABLE MIRROR-BRACKET.

SPECIFICATION forming part of Letters Patent No. 325,419, dated September 1, 1885.

Application filed February 2, 1885. (No model.)

*To all whom it may concern:*

Be it known that I, JOHN J. LANGDON, of South Pueblo, in the county of Pueblo and State of Colorado, have invented a new and Improved Adjustable Mirror-Bracket, of which the following is a full, clear, and exact description.

The object of my invention is to provide a new and improved mirror bracket or holder, by means of which the mirror can easily be adjusted higher or lower, according to the size of the person, and can be inclined laterally and to the horizontal plane.

The invention consists in the arrangement and combination of parts and details, as will be fully set forth and described hereinafter.

Reference is to be had to the accompanying drawings, forming part of this specification, in which similar letters of reference indicate corresponding parts in both the figures.

Figure 1 is a longitudinal sectional view of my improved adjustable bracket and the mirror held by the same, on the line $x\,x$, Fig. 2. Fig. 2 is a sectional plan view of the same on the line $y\,y$ of Fig. 1.

The plate A is provided with a recess or opening, D, through which the rods $a$ pass, one above the other, and on each rod a plate, A', is hung to swing vertically, and on the free ends of the plates cross-rods $a^3$ are held, which pass through a vertical plate, $a^2$, passed into longitudinal slits $a^5$ in the free ends of the plates A'.

The vertical plate $a^2$ is provided with a series of apertures, $a^4$, arranged in an inclined row, and adapted to receive a pin, C.

In the outer end of the plate $a^2$ an upright rod, B, is held, and on the ends of the same a U-shaped piece or stirrup, B', is mounted to swing laterally, and is provided on its upright piece with lugs $B^2$, to which a fork, $B^4$, is pivoted, projecting from the back of a cross-piece, $B^3$, provided on its ends with angle-clips $b$, passed into notches $b'$ in the rear surfaces of the side pieces of the mirror-frame $c$, the said angle-pieces having pins or pivots $d$, on which the frame can swing.

The pin C is withdrawn, and then the mirror may be moved vertically as much as may be desired, and is held at the desired elevation by passing the pin C through one of the apertures, $a^4$, which pin rests upon the upper surface of the upper plate, A', which is thus prevented from swinging downward farther.

The mirror can be tilted more or less by swinging on the pivots $d$, or can be swung laterally, turning on the jaws $B^2$, or the stirrup B' can be swung laterally.

The mirror is thus capable of adjustment vertically, and can be tilted and inclined laterally.

The plate A is secured to a wall, dressing-case, &c.

Rods may be used in plate A.

I am aware that it is old to employ a bracket that is capable of horizontal movement, as is also a vertically-adjustable bracket, the means used for such purpose comprising pivoted arms, adjustable in one instance by a rack and pawl, and in the other instance by a slotted connection and screw-bolt.

Having thus described my invention, what I claim as new, and desire to secure by Letters Patent, is—

1. The combination, with two bars or rods, one above the other, pivoted to swing laterally, of a vertical plate pivoted in the free ends of the vertically-swinging plates, and provided with apertures, and a pin passed through one of the said apertures, substantially as herein shown and described.

2. The combination, with the bars A', or rods pivoted to swing vertically, and having their free ends slitted longitudinally, of the plate $a^2$ in the said slits, pins passed through the ends of the plates A' and through the plate $a^2$, the latter plate having apertures $a^4$, the pins C, and a mirror-frame held to the plate $a^2$, substantially as herein shown and described.

3. The combination, with the vertically-swinging plates A', of the plate $a^2$, having apertures $a^4$, the pin C, the U-shaped piece or stirrup B', pivoted on the plate $a^2$, and a mirror held to the stirrup, substantially as herein shown and described.

4. The combination, with the vertically-swinging plates A', of the plate $a^2$ having apertures $a^4$, the pin C, the stirrup B', pivoted on the plate $a^2$, the cross-piece $B^3$, pivoted to the stirrup, and the mirror-frame $c$, pivoted on the cross-piece $B^3$, substantially as herein shown and described.

5. The combination, with the vertically-swinging plates $A'$, of the plate $a^2$ to the stirrup $B'$, pivoted on the plate $a^2$, the cross-piece $B^3$, pivoted on the stirrup $B'$, and having angle-pieces $b$, provided with pivots $d$, and the mirror-frame $c$, having recesses $b'$, substantially as herein shown and described.

JOHN J. LANGDON.

Witnesses:
GEORGE SNELL,
JOSEPH WATKINSON.